June 7, 1966 A. Y. BAKER 3,254,431
TEACHING MACHINE
Filed March 19, 1962 3 Sheets-Sheet 1

INVENTOR.
Arthur Y. Baker

Attorneys

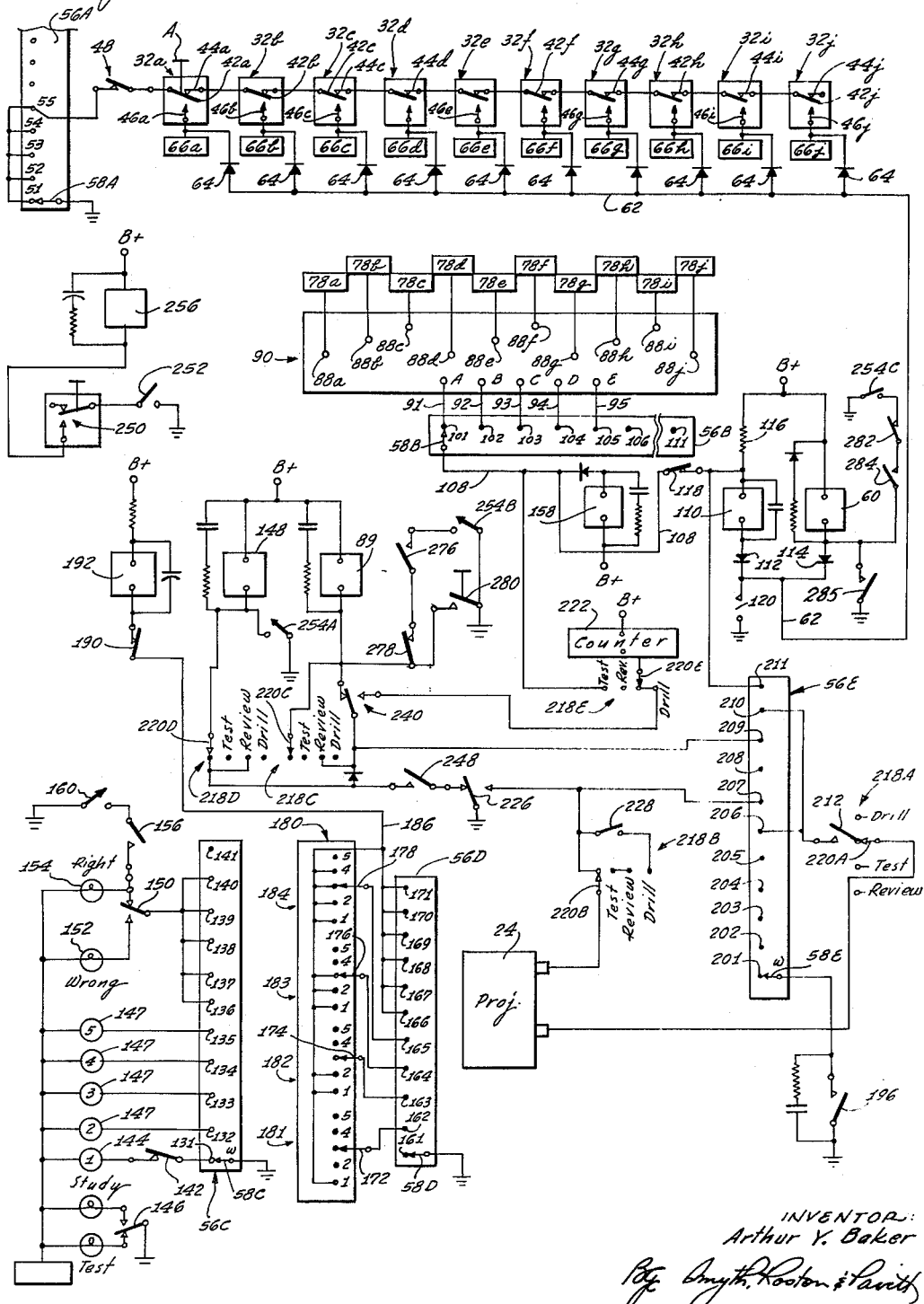

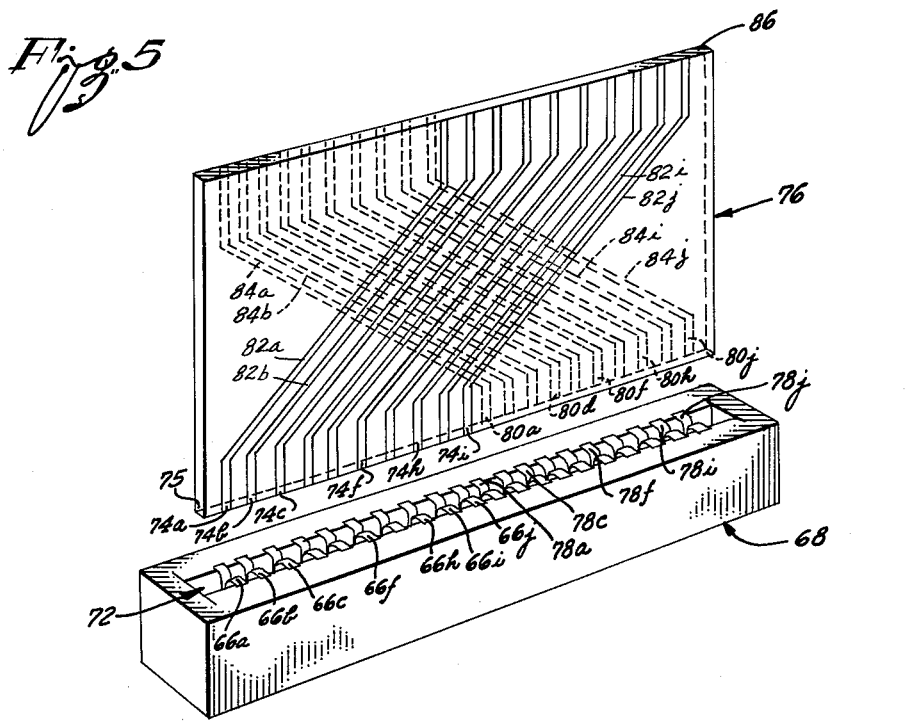

United States Patent Office 3,254,431
Patented June 7, 1966

3,254,431
TEACHING MACHINE
Arthur Y. Baker, Torrance, Calif., assignor to Education Engineering Associates, Torrance, Calif., a corporation of California
Filed Mar. 19, 1962, Ser. No. 181,505
19 Claims. (Cl. 35—9)

The present invention relates to teaching machines and more particularly to a teaching machine that will increase a student's learning rate and insure a greater comprehension and retention.

At the present time there is a great amount of effort being directed toward producing teaching machines which will not only increase the rate at which a student can assimilate large volumes of information but also increase his comprehension and retention thereof. At the present time perhaps the most common form of teaching machine employs the so-called Skinner technique. In machines employing this technique a small fragment of text material relating to the subject to be learned is presented to the student together with a question to be answered. The student is then required to write or select the correct answer. The text material and the question are inherently simultaneously available to the student so that the student has several clues to assist him in choosing a correct answer. Following the student's answering the question the correct answer is presented to the student for comparison with his answer. The student can then quickly observe whether or not he has provided a correct answer to the question. It has been found that although this technique can be an effective aid to the learning process, it has several very serious limitations. When embodied in a teaching machine having multiple choice answers, the selection of possible answers is limited to such a relatively small number that a student may guess at the answers with a reasonably high probability of guessing a correct answer in a relatively short period of time. Since the student can endeavor to "beat the machine" rather than learn the material, the machine does not have complete control over the student. As a result, its effectiveness is limited by the diligence of the student. In addition, it has been found that in order for a machine of this nature to be reasonably effective, the errors made by the student must be on the order of five percent or less. This necessitates a very careful arrangement and programming of the text material, questions and answers. This in turn requires a highly trained and experienced person to prepare the materials. This not only increases the cost and thereby reduces the effectiveness but also severely restricts its flexibility and usefulness.

A second form of teaching technique that is also amenable to use in machines is the so-called "branching method." In a teaching machine employing the "branching method," a small fragment of text material is presented to the student together with a single question and a multiplicity of possible answers. After studying the text material, the student selects an answer. If the answer is incorrect, the student's attention will be directed onto a "branch" containing supplemental text material. This material will expand the original text, indicate the type of error the student probably made, how to correct such an error, and then return him to the original text material and question. The student will then try to again answer the question. When a correct answer is given, the student will be directed onto next text material and question. This technique has been reasonably effective where the number of possible errors is similar to the number of branches and where a given answer is always a result of a single mistake. However, when the number of errors exceeds the number of available branches and/or when a given erroneous answer may be the result of several different errors the supplemental text material will not accurately instruct the student as to his error. In addition, since there are only a limited number of answers to a question, the student can endeavor to guess at the answers with a sufficiently high probability of "beating the machine" to permit him to advance without actually comprehending the material. Accordingly, it will be seen that in this form of teaching machine, the machine does not have complete control over the student.

It is now proposed to provide a new and novel teaching machine which will overcome the foregoing difficulties. More particularly, it is proposed to provide a teaching machine wherein the teaching machine will have complete control over the student thus making it mandatory for the student to learn the material presented before he can advance through the entire lesson or program. This is to be accomplished by providing a teaching machine that will present material in a manner that is completely controlled by the machine and is determined by the manner in which the student responds. The machine may be operated in several different modes for compelling a student to study in different manners. When operating in a teaching mode a certain amount of text material is first presented to the student for his study and then a group of questions with a large number of possible answers relating to the text material are presented. Since the text material and questions are alternatively displayed, the student can not obtain the answer by quickly referring to the text material so that the student must remember the text material until he has answered the question. The questions are presented in groups with a large group of possible answers so that the student must select in sequence an answer for each of the questions. In the event he chooses the correct answers for each and every one of the questions, he will be advanced to new text material for further studying and questioning. In the event one or more questions in the group are erroneously answered, the student is automatically referred back to the text material for further study. Since the student is not told which question in the group he missed, it is necessary for him to restudy all of the text material in order to determine his mistake. In addition, since there are a group of questions and a plurality of answers, there are such an extremely large number of possible combinations for answering the questions in a group it is virtually impossible for a student to guess at the questions and "beat the machine," particularly in view of the fact the student never knows for sure which question he has erroneously answered. In order to increase a student's comprehension and retention, the machine may also be used for drilling, testing, and reviewing. In these additional modes, text material and/or questions and answers are presented to the student so that it will be impossible for the student to "beat the machine" by guessing and it will be mandatory for the student to properly apply the material he has learned before he can advance.

These and other features and advantages of the present invention will be readily apparent to those skilled in the art, particularly when taken in connection with the accompanying drawings wherein like reference numerals refer to like parts and wherein FIGURE 1 is a perspective view of a teaching machine embodying the present invention.

FIGURE 4 is a diagrammatic view of the control means for use in the teaching machine of FIGURE 1.

FIGURE 5 is a perspective view of a scramble board for use in the diagram of FIGURE 4.

Figure 1:
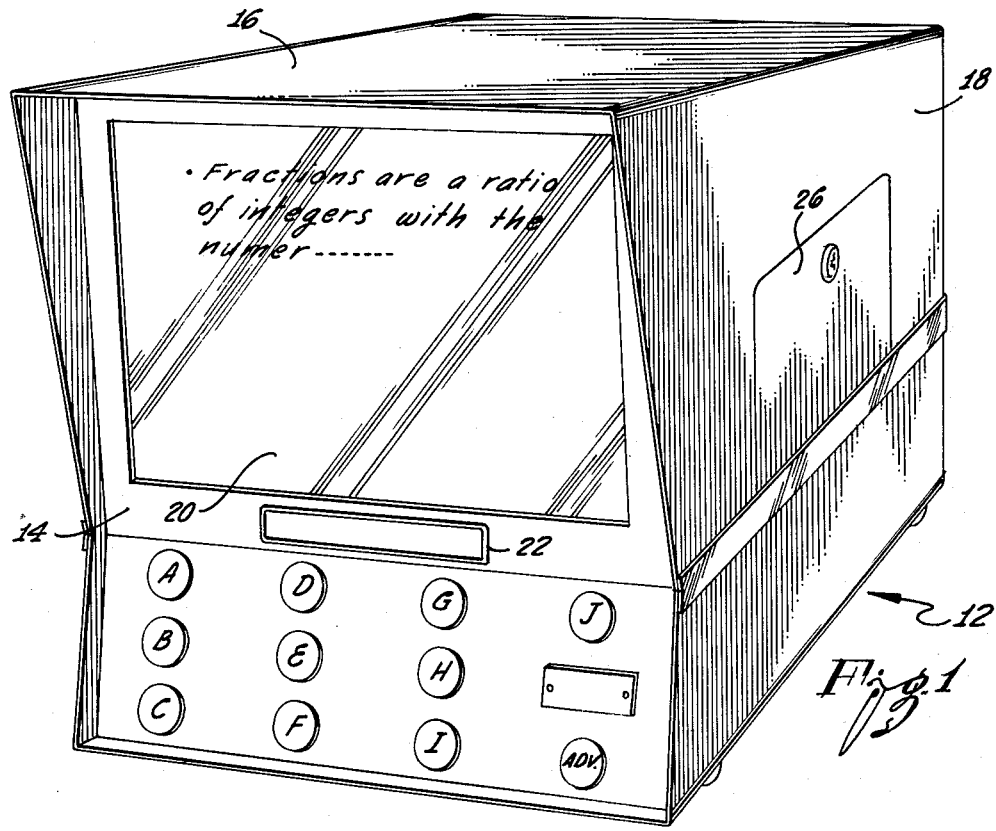

Referring to the drawings in more detail, the present invention is embodied in a teaching machine 12 which is particularly adapted for presenting material to a student in such a manner that he must learn the material. Although the machine may be embodied in any suitable structure, in the present instance it includes a housing having a front panel 14 that will be visible to a student positioned to utilize the machine 12. Rear and top panels 16 may be secured to the front panel and side panels 18 so as to enclose a chamber in which portions of the teaching machine may be disposed.

The upper portion of the front panel 14 includes a rear projection screen 20 that is clearly visible to a student and is adapted to have material projected onto the rear side thereof, for view from in front of the machine 12. The center portion includes an instruction display 22 and the bottom portion includes a plurality of answer buttons, A, B, C, D, E, F, G, H, I and J, and an "AD-VANCE" button, which a student must operate in response to the instructions on the display 22.

In order to present the material on the screen 20, a suitable projector 24 may be disposed inside of the screen housing so as to project a luminous picture onto the screen. Although this projector 24 may be of any suitable variety, it is preferably capable of storing a large amount of projection material and mechanically changing the material being projected. By way of example, it has been found that a so-called 35 mm. projector having a slide changing mechanism may be employed. In a projector the changer mechanism may include a magazine rack that is positioned adjacent an access door 26 in the side panel 18 whereby a magazine of transparent slides may be placed in the rack.

The instruction display 22 includes a plurality of selectably illuminatable indicia for indicating how the student is to consider the material presented on the screen 20 and in what manner if any he is to manipulate the buttons. The indicia illuminated in the display 22, the material projected onto the screen 20 and the response that the machine 12 makes to the student's manipulation of the buttons may be determined by an electronic circuit 30 such as shown in the diagram of FIGURE 4.

As may be seen from this diagram of the circuit 30, the buttons A to J inclusive are respectively connected to a plurality of switches 32a to 32j inclusive. Each of these switches 32a to 32j corresponds to one of the multiple answers that are presented to the student. Each of these switches includes a moveable contact 42a to 42j that will normally engage a fixed contact 44a to 44j but will engage an alternate fixed contact 46a to 46j when a corresponding button A to J is pressed. The moveable contact 42a in the first switch 32a is connected with a relay controlled switch 48. The opposite side of the switch 48 is connected to the first five fixed contacts 51 to 55 inclusive in one bank 56A of a rotary switch 56.

Although the switch 56 may be of any suitable variety, it preferably has five banks 56A, 56B, 56C, 56D and 56E with eleven contacts in each bank. It has been found that a telephone stepping switch is well suited for this purpose. Such a switch normally has five banks of contacts with 11 fixed contacts in each bank. A separate wiper or moveable contact is provided for each of the banks and effective to actuate a ratchet drive for advancing all five of the contacts one step each time it is energized so that the wipers will move from the first through the eleventh contacts and back to the first contact. The contacts 51 to 55 of bank 56B are all interconnected with each other while the remaining fixed contacts are not connected to anything. The wiper or moveable contact 58A is electrically connected to ground and mechanically connected to the stepping coil 60.

Each of the moveable contacts 42b to 42j of the switches 32b to 32j are electrically connected to the fixed contact 44a to 44i respectively of the preceding switch. Each of the remaining fixed contacts 46a to 46j is connected to a common ground conductor 62 by diodes 64. Each of the contacts 46a to 46j is also connected directly to a series of jacks 66a to 66j. These jacks 66a to 66j are preferably disposed in an opening 72 in a holder 68 positioned adjacent an access door 26 in the side panel 18. These jacks 66a to 66j are preferably disposed adjacent one end of the opening 72 so as to extend along one side thereof in an orderly sequence so as to electrically and mechanically engage complementary contacts 74a to 77j positioned along one edge 75 of a scramble board 76. A second set of similar jacks 78a to 78j may be disposed in the holder 68 adjacent the opposite end of the opening 72 for engaging a second set of contacts 80a to 80j positioned on the other side of the board 76 adjacent the edge 75.

The scramble board 76 is preferably a dielectric member having a first set of electrical conductors 82a to 82j disposed on one side thereof and electrically interconnected with each of the fixed contacts 74a to 74j respectively. A second set of similar conductors 84a to 84j may be disposed on the opposite side of the board 76 for being electrically interconnected with each of the fixed contacts 80a to 80j respectively.

The two sets of conductors are oblique to each other so that they will effectively cross each other. Thus, by drilling a hole through the board 76 so as to extend through the crossing conductors, an electrical connector may be positioned in the hole for interconnecting any two conductors. Thus, by drilling a plurality of holes through the board 76 each of the conductors 82a to 82j may be interconnected with one of the conductors 84a to 84j. If the positions of the holes are varied from board to board, the interconnection between the jacks 66a to 66j and the jacks 78a to 78j may be "scrambled" according to a predetermined code. If the conductors 82a to 82j and 74a to 74j extend completely across the board 76 to contacts on the opposite edge 86, the inseating of the edge 86 into the opening 72 will scramble the interconnection according to a different code.

Each of the jacks 78a to 78j are separately interconnected with various ones of the fixed contacts 88a to 88j in a second rotary stepping switch 90. Although this switch 90 may be of any suitable variety, it is preferably a stepping switch similar to the preceding stepping switch 56. This switch 90 includes a relay coil 89 that is mechanically connected to a group of wipers or moveable contacts for advancing the contacts one position each time the coil 89 is energized. As the coil 89 is energized, the moveable contacts will sequentially interconnect each of the conductors 91, 92, 93, 94 or 95 to one of the contacts 88a to 88j.

The interconnection between the conductors 91, 92, 93, 94 and 95 and the contacts 88a to 88j will be a fixed predetermined arrangement but it is preferably a random interconnection. However, the interconnection between the jacks 66a to 66j and the jacks 78a to 78j will vary or be scrambled according to the coded interconnections on the particular scramble board 76 being employed.

It may thus be seen that all of the moveable contacts 42a to 42j of switches 32a to 32j are normally at ground potential. However, if one of the buttons A to J is depressed, a corresponding switch 32a to 32j will be actuated. This will move the corresponding moveable contact 42 to a corresponding fixed contact 46 and thereby remove the ground potential from all of the succeeding moveable contacts 42. This will insure only one of the switches 32 being effective at any given time. The actuated switch will simultaneously connect the common ground lead 62 and one of the jacks 66a to 66j to ground. A ground connection will then be established across the scramble board 76 to one of the contacts 88a to 88j in the rotary stepping switch 90. If the button A to J which was pressed corresponded to the correct answer, the ground connection will be extended to one of the conductors 91 to 95.

Each of the conductors 91 to 95 is connected to contacts 101 to 105 respectively in bank 56B of the stepping switch 56. This bank 56B includes a moveable contact 58B that is effective to move a step at a time across the contacts 101 to 105. It will thus be seen that a correct answer will also cause the conductor 108 connected to contact 58B to be connected to ground. In the event the button A to J that is depressed does not correspond to the correct answer, the common ground line will be connected to ground. However, the ground connection for the line 108 will be broken in the switch 90 or in bank 56B.

The common ground connector 62 is connected to the lower end of the stepping coil 60 and the lower end of a relay coil 110 by means of separate diodes 112 and 114. The upper side of the coil 60 is connected directly to a D.C. power source while the upper side of the coil 110 is connected to the source by a current limiting resistor 116. A normally closed switch 118 which is operated by the relay coil 110 connects the upper side of the coil 110 to the line 108. A normally open switch 120 which is also operated by the relay 110 connects the relay coil 110 to ground so as to hold the relay coil 110 energized.

It may be seen that each time one of the buttons A to J is depressed, one of the switches 32a to 32b will connect the lower ends of coils 60 and 110 to ground. As a result, each time a student answers a question, the coil 60 will be energized and the moveable contacts 58A, 58B, 58C, 58D and 58E in each of the banks 56A, 56B, 56C, 56D and 56E will advance at least one position. If the depressed button corresponds to the correct answer, the line 108 will be grounded so that both ends of coil 110 will be grounded and the coil 110 will not be energized. However, if the button depressed corresponds to an incorrect answer, the line 108 will not be grounded so that only the lower end of the coil 110 will be grounded. This will result in the coil 110 being energized. Among other things, this will immediately close the switch 120 to connect the coil to ground and make it self energizing and open switch 118 to prevent a future correct answer grounding the upper end of the coil 110 and de-energizing it prematurely.

The coil 60 is operatively coupled to ratchet drive for simultaneously moving a gang of wipers or moveable contacts 58A, 58B, 58C, 59D, and 58E in the banks 56A, 56B, 56C, 56D and 56E of the stepping switch 56. Each of the moveable contacts 58A, 58B, 58C, 58D and 58E is electrically isolated from each other but they are mechanically interconnected for synchronous movement across the fixed contacts in unison from the lowest numbered contact to the highest numbered contact and return to the lowest numbered contact in response to energizing of coil 60.

The first contact 131 of bank 56C is connected to a switch 142 that is controlled by the relay coil 148 and that is electrically connected to a light 144 for illuminating a number "1" on the instruction display 22. A switch 146 also operated by relay coil 148 may alternatively interconnect the "TEST" or "STUDY" lights disposed on the instruction display 22. Contacts 132 to 135 inclusive are respectively connected to lights 147 for illuminating the numbers 2 to 5 inclusive in the display 22. The contacts 136 to 140 inclusive are all connected together and to a moveable contact in a switch 150 controlled by the relay coil 110. One of the fixed contacts of switch 150 is connected to light 152 for illuminating a "WRONG" on the display 22. The other contact is connected to a light 154 for illuminating a "RIGHT" and to a switch 156 controlled by a relay coil 158 and a manually controlled toggle switch 160.

The bank 56D may have the moveable contact 58D connected to ground so that it will ground each of the succeeding fixed contacts 161 to 171 as the contact 58D advances. The fixed contacts 162, 163, 164 and 165 are connected to the moveable contacts 172, 174, 176 and 178 respectively of a manually actuatable selector switch 180 for controlling the number of questions to be answered. This switch includes four separate banks 181, 182, 183 and 184 of contacts with at least five contacts in each bank. The contacts 166 to 171 inclusive of bank 56D are all connected together and to the first contact of bank 181, the first and second contacts of bank 182, the first, second and third contacts of bank 183, and the first, second, third and fourth contacts of bank 184. All of these contacts are also connected to a conductor 186 that leads to the moveable contact in a switch 190 operated by a relay coil 192.

The bank 56E may have the moveable contact 58e connected to ground by means of a switch 196 that is operated by the coil 192 in unison with the switch 190. The fixed contacts 201 to 205 inclusive are not connected to anything. However, contacts 206 and 210 are connected together and to one side of a switch 212 operated by the coil 110. The opposite side of the switch 212 is connected to a "TEACH" contact in bank 218A of a manually actuated mode selector switch 216. This mode selector switch 216 is preferably disposed inside of the door 26 and banks 218A, 218B, 218C, 218D and 218E of fixed contacts.

The moveable contact 220A in the bank 218A is connected to a solenoid control in the changer mechanism for the projector 24. This solenoid when energized is effective to move the forward-reverse control in the change mechanism from one position to another.

The contact 207 is connected to one of the fixed contacts in a switch 226, one side of the switch 228, and to some of the fixed contacts in bank 220B of the mode selector switch 216. The remaining fixed contact of the bank 220B is connected to the opposite side of the switch 228. The switch 228 is controlled by the relay coil 110 which it will be remembered is energized whenever a wrong answer is given. The movable contact 220B and bank 218B is connected directly to the changer mechanism in the projector 24.

The coil 89 has one side thereof connected to the D.C. source, while the other end thereof is connected to a fixed contact in the switch 240 and to the movable contact 220C in bank 218C of the mode switch 216. The moveable contact in switch 240 and one of the fixed contacts in bank 218C are connected to the fixed contact 209. The remaining fixed contact 211 is connected to the upper end of coil 110.

The relay coil 148 has the upper end connected to the D.C. source while the lower end is connected to the moveable contact 220D in the bank 218D of the mode selector switch 216. Although two of the contacts in the bank 218D are disconnected, the remaining contacts are connected together and to the switch 248.

The "ADVANCE" button may be interconnected with a switch 250 that has one side thereof connected to a switch 252 controlled by the relay coil 148. The other side of the switch 250 is connected to the lower end of a relay coil 256 which in turn is connected with the D.C. supply line.

TEACH MODE

Most frequently, and particularly during the initial phases of a course or program, the teaching machine 12 will be operated in the teach mode. To place the machine 12 in operation in the "TEACH" mode, selector switch 216 is manually placed in the "TEACH" position so that the moveable contacts 220A, 220B, 220C, 220D and 220E will be positioned substantially as shown and will engage the teach fixed contacts in each of the banks 218A, 218B, 218C, 218D and 218E. This will effectively interconnect the control solenoid in the changer mechanism with contatcs 206 and 210 of bank 56E, interconnect changer mechanism directly with the switch 226 and contact 207 of bank 56E and interconnect the lower side of the relay coil 148 with the switch 248.

A tray or magazine of slides suitable for use in the teach mode may be positioned in the changer rack, so that the number one slide will be in the number one position. Such a magazine will constitute a lesson and will include enough material to require an average student to spend some unit of time such as an hour to progress therethrough.

The slides in a teaching tray or magazine will normally include two groups or types of slides. Each of the slides in the first group are similar to those in FIGURE 2. Such a slide includes primarily text material relating to the subject the student is to study. The volume of this text material may vary within wide limits. However, it has been found desirable to include an amount that is readily comprehended by the student. The text material on the succeeding slides will gradually become progressively more advanced until all of the text material to be covered in the lesson is included on the slides. Each of the slides in the second group is similar to those in FIGURE 3 and includes a group of questions and a group of answers. Although any number of questions and answers may be employed, it has been found that a group of five questions in combination with ten possible answers is satisfactory. The slide in FIGURE 3 is therefore shown as having questions 1 to 5 inclusive and answers A to J inclusive. The slides in the two groups are interspersed with each other so that the first slide will be a text slide and the second slide will be questions and answers relating to the preceding text material. The succeeding slides will be alternating text material and question-answers with all the questions on any given slide being related directly to the text material in the immediately preceding slide.

Once the magazine is in the number one position, the various relays, stepping switches, etc. may all be set to corresponding positions. In the present instance, this is accomplished by means of a homing button that may be manually depressed to momentarily close the contacts in the ganged switches 254A, 254B and 254C. The switch 254A is connected between the lower end of relay coil 148 and ground so that closing the switch 254A will momentarily energize relay 148. As soon as relay 148 is energized, the contacts in switch 248 will close so as to form a ground circuit from the relay coil 148 through the bank 218D of the mode switch 216, switch 248, and switch 226. This will make the relay 148 self holding. This in turn will insure the switch 252 being held closed and the "ADVANCE" switch 250 being enabled, the switch 146 being moved to the study position to turn on the "STUDY" light, and the switch 142 being open and the light 144 extinguished so that the #1 for the first question will be off.

When the second switch 254C closes, it will connect an "On Normal" switch 282 and an "Interrupter" switch 284 in the first stepping switch 56 with ground. If the stepping switch 56 is not in the home or number one position, the "On Normal" switch 282 will be closed and the coil 60 will be energized. This will cause the wipers on moveable contacts 58A, 58B, 58C, 58D, and 58E in the banks 56A, 56B, 56C, 56D and 56E to advance one position. This will also cause the switch 284 to open momentarily and de-energize the coil 60. The ratchet drive in the stepping switch 56 will instantly reset and whereby switch 284 will again close and re-energize the relay coil 60. This energizing and deenergizing will continue until all of the moveable contacts 58A to 58E are advanced to home or #1 position. At this point the contacts in the "On Normal" switch 282 will open and prevent any further advancing. This will place all of the moveable contacts in position to correspond to the number one slide. If it is desired to start in the middle of a lesson, the magazine may be advanced to an intermediate point and a switch 285 manually depressed to energize the relay 60 and advance the moveable contacts in the banks 56A to 56E to a corresponding position.

The third switch 254B may interconnect an "On Normal" switch 276 and an "Interrupter" switch 278 for the second stepping switch 90 with ground. The switches 276 and 278 are similar to switches 282 and 284 and will repeatedly pulse the coil 89 until all of the moveable contacts in the stepping switch 90 have moved to the number one position and the "On Normal" switch 276 has opened. Switch 280 may be included and has the same function as switch 285.

Following this, a slide will be in the projection position so that the material thereon will be present on the screen 20 and visible to a student. As pointed out before, this will normally consist entirely of text material. The student may then study this text material until he comprehends it or as long as he desires. When the student has completed studying the text material, he depresses the "ADVANCE" button, thereby closing the switch 250. Since the switch 252 is closed, the relay coil 256 will be energized and cause the moveable contact in switch 226 to move away from the position shown. This will create a ground connection for the slide changer mechanism and cause the slide in projection position to be changed. More particularly, the changer will remove the text slide and replace it with the succeeding slide having questions relating thereto.

At the same time the switch 226 moves, it will break the ground for the relay coil 148. This will result in coil 148 becoming deenergized whereby the switch 146 will move to extinguish the "STUDY" light and turn on the "TEST" light. The switch 142 will also close and turn on the question light 1. In addition, the switch 252 will open and disable the "ADVANCE" button. However, switch 48 will close and enable the answer buttons A to J.

At this time the student will see on the screen 20 a group of five questions numbered consecutively 1 through 5 and a group of 10 possible answers numbered A through J inclusive. At the same time, the display 22 will have illuminated thereon the word "TEST" and the number "1" thereby, indicating that the student must pick an answer to the first question. When the student has decided on an answer he belives to be correct, he depresses a button A to J corresponding to the answer. When the button is depressed it will actuate the corresponding switch 32a to 32j and cause the condutor 62 to be grounded. This will ground the lower end of the stepping switch coil 60 and result in its being energized. This will advance each of the moveable contacts 58A to 58E in the banks 56A to 56E to the second positions, the contact 58C to cause light "1" to be extinguished and light "2" to be turned on. This will be the only change that will be apparent to the student and will indicate that he is now required to select an answer to question 2. The student will then proceed to answer questions 2 to 5 as directed by the lights "2" to "5" inclusive being turned on in sequence.

In addition to grounding the lower end of the coil 60, the closing of one of the switches 32a to 32j will also ground the lower end of the coil 110. However, if the switch 32a to 32j that is closed corresponds to the correct answer, a continuous electrical path will extend through a contact 46, a jack 66, the scramble board 76, a jack 78, the stepping switch 90, bank 56B and conductor 108 to the upper end of coil 110. It will thus be seen that a correct answer will ground both ends of the relay 110 and prevent it being energized. However, if the switch 32 that was closed does not correspond to the correct answer, the circuit will be broken at the scramble board 76 or stepping switch 90 whereby only the lower end of coil 110 will be grounded and the coil 110 will be energized.

Although energizing relay coil 110 will not immediately produce any externally visible signs, it will close the switch 120 and form a second ground circuit that will hold the coil energized. In addition, the switch 118 will open and prevent a subsequent correct answer de-energizing the coil 110. Among other things, this will open the switch 240 and break any possible ground circuits for coil 89, move switch 150 away from its present position and break the circuit for the "RIGHT" lamp 154 and form a circuit for the "WRONG" lamp 152. In addition, the switch 212 will close so as to connect the bank 218A to contacts 206 and 210. In the event it is desired to keep a record of the number of mistakes that a student makes a counter may be connected to the D.C. source and the bank 218E of the mode selector switch 216. The bank 218E is in part connected to the switch 240 so that each time a wrong answer actuates the switch 240 it will add a count thereto.

It may thus be seen that if answering questions 1 to 5 inclusive the student has given the correct answer for each question, the relay coil 110 will not be energized. However, if any one or more of the questions in the entire group were answered incorrectly, the coil 110 will have been energized and since the switch 118 will be opened, the coil 110 will be retained energized even if a subsequent question were correctly answered. When the student has answered the fifth question, the moveable contacts 58A to 58E will all move to the next or sixth position. The contact 58D will engage contact 166 and thereby connect the switch 190 to ground. Since this switch 190 is normally closed, the relay coil 192 will be energized. This will immediately open the switch 190 and de-energize coil 192, whereby the switch 190 will again close and energize the coil 192. The rate at which this switch 190 opens and closes and coil 192 energizes and de-energizes may be controlled by the rate at which a condenser 284 disposed across coil 192 charges and discharges. Each time the coil 192 is energized, a switch 286 will close. This switch 286 extends from the coil 60 to ground so that its opening and closing will cause the coil 60 to advance all the moveable contacts 58A to 58E. This process will continue until the contact 58D has advanced from contact 171 to 161 and the ground connection for switch 190 is thereby broken.

Assuming first that the student correctly answered all of the questions in the group, the relay 110 will not be energized at the time the fifth question has been answered. As a result, switch 212 will be open and as the contact 58E passes contacts 206 and 210 the solenoid control in the changer mechanism will not be energized and the changer mechanism will remain in the forward condition. When the contact 58E passes over the contact 207 a ground connection will be established through bank 218A of the mode selector switch 216 to the changer mechanism. This will cause the slide mechanism to remove the question and answer slide and advance to the next slide having text material thereon.

When the moveable contact 58E in bank 56E engages contact 209 a ground connection will extend through the bank 218D of the mode selector switch 216 to the lower end of relay coil 148 so as to close switch 248 and hold the relay 148 energized. This will actuate switch 146 to extinguish the "TEST" light and turn on the "STUDY" light, open switch 142 to thereby disable the question light "1." Switch 48 will open and disable the "ANSWER" buttons A to J and switch 252 will close to enable the "ADVANCE" button.

It should also be noted that during the foregoing process, since the relay coil 110 was not energized, the switch 150 will be in the position shown. Thus as the contact 58C passes across the contacts 136 to 140, the "RIGHT" light will be energized to indicate to the student he has answered all of the questions in the group correctly.

In contrast, assume that in answering all of the questions in the group, the student made one or more mistakes. As previously pointed out, relay coil 110 will be energized so that the holding switches 118 and 120 will respectively open and close.

The contact 58D will sweep across the contacts 166 and 171 so as to cause the coil 192 to step the switch 56 back to its home position substantially as described above. Since coil 110 is energized, the switch 150 will be moved from its illustrated position so as to cause the "WRONG" light to be illuminated, while the contact 58C sweeps across contacts 136 to 140. This will only indicate to the student that at least one of the questions in the group was incorrectly answered. When the contact 58C is in the number one position, the switch 142 will be open and light "1" will be off and the switch 146 will be positioned to extinguish the "TEST" light and turn on the "STUDY" light.

The switch 212 will now be closed whereby engagement of moveable contact 58E with the contact 206 will energize the solenoid in the changer mechanism. This will cause the changer mechanism to be shifted into reverse condition. When the contact 58E engages contact 207, the changer mechanism will be grounded through the bank 218B and will accordingly change the slide in the projection position. However, since the changer was previously placed in the reverse condition, the changer will remove the question and answer slide projected on the screen and replace it with the slide preceding the question and answer slide. This text material will relate to the question previously shown. When the contact 58E passes over contact 209 it will ground the relay coil 148 so as to energize it and disable the "ANSWER" buttons, enable the "ADVANCE" buttons, extinguish the "TEST" light and turn on the "STUDY" light. Since the switch 240 will be positoned opposite from that shown, the counter will be energized when contact 58E passes contact 209 whereby a count will be accumulated. When the contact 58E engages contact 210, the solenoid will again be energized so as to return the changer to the forward condition. When the contact 211 is grounded by the contact 58E, the upper end of relay coil 110 will be grounded, whereby coil 110 will be de-energized.

Figure 2:
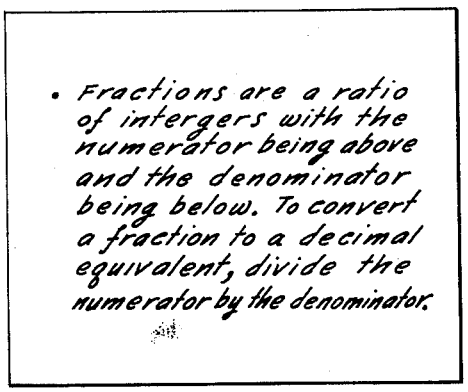
FIGURE 2 is a view of one form of material presented by the machine of FIGURE 1.
Figure 3:
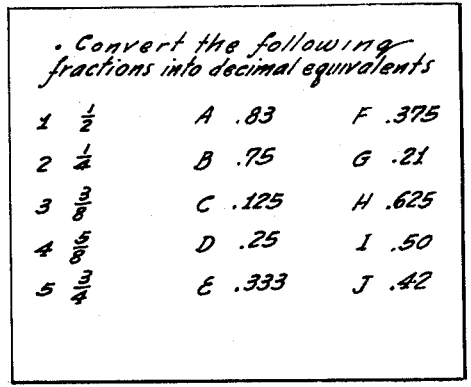
FIGURE 3 is a view of another form of material presented by the machine of FIGURE 1.

It may thus be seen that when the machine is set to operate in the "TEACH" mode, initially the word "STUDY" will be illuminated on the instruction display 22 and a slide such as in FIGURE 2 and containing text material will be projected onto the screen 20. The student may then study this material on the screen until he feels he comprehends it. He may then push the "ADVANCE" button to change the slide. If desired, a timer may be provided for automatically advancing the slide to thereby impose a time limit on the student.

The material projected onto the screen 20 will then change to a slide similar to FIGURE 3 and containing a group of questions and a group of possible answers. The "STUDY" light will be turned off. The "TEST" and the number "1" will be on. While the "TEST" light is on, all of the numbered buttons A to J will be enabled but the "ADVANCE" button will be disabled.

The test slide in the present embodiment consists of five questions numbered to correspond to the question lights and ten possible answers numbered A to J to correspond to the answer buttons. The student now proceeds to depress a button A to J to correspond to the answers to questions 1 to 5 as indicated by the numbered lights in the display 22. When all of the questions have been answered, the slide will automatically be changed to a text slide. If all questions were correctly answered, the projector will advance to the next succeeding text slide. However, if all questions were not correctly answered, the projector will return to the preceding text slide, whereby the student must restudy the text material and determine his error or errors and how to correct them.

It should be noted that if the student makes a mistake, he will not be told which questions he missed. Instead, turning on of the "WRONG" light and returning to the preceeding slide will only indicate that not all questions were correctly answered. It is therefore necessary for the student to determine his own error and to correct. Since there are five questions and ten possible answers, there are 3024 possible ways to answer the questions in a group. Accordingly, if a student endeavors to guess at the answers, he will on the average make over 1500 guesses before selecting the correct combination of answers. Therefore, as a practical matter, this is a prohibitive process and as a consequence, it is mandatory for the student to correct his own mistakes if he is to advance. It is thus readily apparent that in this sense, the machine has complete control over the student and it is futile for him to endeavor to "beat the machine" by guessing.

DRILL MODE

Normally, after a student has completed a program or lesson contained in a tray of slides for use in operating the machine in a teaching mode, he has attained only a limited amount of comprehension and proficiency in the subject matter. It is therefore frequently desirable for the student to repeatedly utilize the material he has learned in order to increase his comprehension, retention and proficiency. In order to accomplish this, the machine 12 may be operated in the drill mode.

To place the machine 12 in condition to operate in the drill mode, the mode selector switch 216 may be manually placed in the "DRILL" position so that the moveable contacts 220A, 220B, 220C, 220D and 220E will be moved to engage the "DRILL" fixed contacts in each of the banks 218A, 218B, 218C, 218D, and 218E. This will effectively connect the changer mechanism in the projector 24 with the switch 228, but at the same time it will disconnect the solenoid for controlling whether the changer mechanism is to operate in the forward or reverse directions. The relay coil 148 will also be disconnected from the circuit so that it cannot be retained energized during operation of the machine 12.

A tray or magazine full of slides suitable for use in the drill mode may be positioned in the changer rack, so that the number 1 slide will be in position for projection. In such a tray or magazine, all of the slides are substantially identical to the slides in the second group in the "TEACH" trays. That is, each slide is substantially identical to the slide shown in FIGURE 3, and in the present embodiment includes a group of five questions numbered 1 to 5 in combination with ten possible answers lettered A to J, inclusive. These questions and answers may relate to the subject matter upon which it is desired to drill the student and may be in any order desired.

Once the magazine is in the number 1 position, the various relay stepping switches, etc. may be all set to corresponding positions. This is accomplished in substantially the identical manner to the "TEACH" mode. That is, the homing button is manually depressed to momentarily close the contacts in the ganged switches 254A, 254B, and 254C. Since the switch 254A is connected between the lower end of the relay coil 148 and ground the relay 148 will be momentarily energized. Although the contacts in switch 248 will be closed, a ground circuit will not be formed for the relay coil 148, since the "DRILL" contact in bank 218D is not connected to anything. It will thus be seen that the relay 148 will not be self holding as in the "TEACH" mode.

When the second switch 254B closes, it will connect the "On-Normal" switch 276 and the "Interrupter" switch 278 in the first stepping switch 56 with ground. If the stepping switch 56 is not in the home, or number one position, both of these switches 276 and 278 will be closed and the coil 89 will be energized, thereby advancing the wipers or movable contacts 58A to 58E in the banks 56A to 56E and opening the switch 278. This will in turn de-energize the coil 89 and cause the ratchet drive in the stepping switch 56 to instantly reset and the switch 278 to again close and re-energize the relay coil 89. This energizing and de-energizing will continue until all of the moveable contacts 58A to 58E are advanced to the home or number 1 position and the "On-Normal" switch 276 to prevent any further advancing. This will place all of the moveable contacts in position to correspond to the number 1 slide.

When the third switch 254C closes, it will interconnect the "On-Normal" switch 282 and the "Interrupter" switch 284 for the second stepping switch 90 with ground. These switches 282 and 284 will then alternately open and close as described in the preceding paragraph and advance all of the moveable contacts in the stepping switch 90 to the number 1 position, at which time the "On-Normal" switch 282 will open and prevent further advancing of the relay.

The first slide will now be in the projection system so that the material thereon will be presented on the screen 20 and visible to a student. Since the relay 148 will not be energized, the switch 146 will be positioned to cause the "TEST" light to be illuminated on the display 22. In addition, the switch 142 will be closed, whereby the number "1" light will be on. This will indicate to the student that he must answer the number one question. In addition the switch 252 will be open so as to disable the ADVANCE button and the switch 48 will be closed so as to enable all of the answer buttons A to J.

When the student has decided on a correct answer to the first question, he depresses a button A to J corresponding to the answer and thereby causes the corresponding switch 32A to 32J to close. This will cause the conductor 62 to be grounded. This will ground the lower end of the coil 60 and result in its being energized. This will advance each of the moveable contacts 58A to 58E in the banks 56A to 56E to the second position. The contact 58C will cause the light "1" to be extinguished and light "2" to be turned on. Normally this will be the only change apparent to the student and will indicate that he is now required to select an answer to question "2." The student will then proceed to answer questions 2 to 5 as directed by the lights 2 to 5 inclusive being turned on in sequence.

In addition to grounding the lower end of the coil 60, the closing of switches 32a to 32j will also ground the lower end of the coil 110. However, if the switch 32a to 32j that is closed corresponds to the correct answer, a continuous electrical path will extend through one of the contacts 46, a jack 66, the scramble board 76, the jack 78, the stepping switch 90, bank 58B and conductor 108 to the upper end of the coil 110. It will thus be seen that a correct answer will ground both ends of the relay 110 and prevent its being energized. However, if the switch 32 that was closed does not correspond to the correct answer, the circuit will be broken at the scramble board, or stepping switch 90, whereby only the lower end coil 110 will be grounded and the coil will be energized. Although energizing coil 110 will not immediately produce any external visible signs, it will close the switch 120 and form a second ground circuit that will hold the coil 110 energized. Also the switch 118 will be opened to prevent a subsequent correct answer grounding the upper end of the coil 60 and de-energizing it.

Among other things, the energizing of the coil 60 will move the switch 240 so as to break any possible ground circuits for the coil 89 to interconnect with the counter 222 with contact 209 in bank 56E. It will also move the switch 150 away from the position shown and break the circuit for the "RIGHT" light and form a possible ground circuit for the "WRONG" light 152. Although the switch 212 will also be closed, no connection will be formed through the bank 218A since the DRILL contact is disconnected. It may thus be seen that if in answering questions 1 to 5 inclusive, the student has given only correct answers, the relay coil 110 will remain de-energized. However, if one or more of the questions in the entire group were answered incorrectly, the coil 110 will be retained energized.

When the student has answered the fifth question, the moveable contacts 58A to 58E will be moved to the next or sixth position. When the contact 58D engages contact 166 it will connect the switch 190 to ground, and cause the coil 192 to be energized. However, this will open the switch 190 and close the switch—and thereby result in stepping all of the moveable contacts 58A to 58E across the various fixed contacts of the various banks 56A to 56E, until the contact 58d has advanced from contact 171 to 161 and broken the ground connection for switch 190. Assuming that the student correctly answered all of the questions in the group and the relay 110 is not energized, the switch 228 will be closed and as the contact 58e passes over the contact 207, the changer mechanism in the projector 24 will be energized and the next succeeding slide will be placed in position for projection onto the screen 20. It should be noted that since the solenoid for changing the changer mechanism between forward and reverse is not connected to the DRILL contact, the changer mechanism will always be in the forward condition. Thus, during the drill mode, the changer mechanism will only be capable of advancing to the next succeeding slide and will not be capable of returning to a preceding slide. When the moveable contact 58C engages contacts 136 to 140, a circuit will be formed through the switch 150 so as to illuminate the RIGHT light 154, thereby indicating to the student that he has successfully answered all of the questions in the group. When the contact 58C returns to contact 131 the light number "1" will be turned on to indicate the student is now required to answer the number one question in the new group.

However, if in answering the questions, the student has made one or more mistakes, the relay coil 110 will be energized. Among other things, the switch 228 will be opened and the switch 150 will be moved to form a possible circuit for the WRONG light 152. Accordingly, as the moveable contact 58C advances across the contact 207, there will not be any circuit established for energizing the changer mechanism and as a consequence, the slide projected onto the screen 20 will not be changed. As the contact 58C passes over the contacts 136 to 140, the WRONG light 152 will be turned on. Thus the student will now know he made one or more mistakes although he will not be told specifically what questions he missed.

When the contact 58C passes over fixed contact 209, a circuit will be formed through the switch 204 to the counter 222 whereby a count will be accumulated that will indicate the number of times the student has failed to correctly answer all of the questions in the group. When the contact 58E passes over contact 211, the upper end of the coil 110 will be energized, whereby the coil 110 will be de-energized.

It may thus be seen that when the machine 12 is set to operate in the DRILL mode, a slide such as shown in FIG. 3 and containing a group of questions and a group of multiple choice answers will be projected onto the screen 20. In addition, the instruction display 22 will have the word "TEST" and the number "1" illuminated thereon to indicate the student is required to answer the number "1" question. In addition, the advance button will be disabled and the answer buttons numbered A to J will be enabled. Each time that the student depresses one of the answer buttons A to J the numbered light indicating the question to be answered will change to the next succeeding number, thereby indicating that the next question is to be answered. If the student successfully answers all questions in the group, at the completion of the answering of the fifth question, the "RIGHT" light will momentarily be turned on and the slide will change to the next succeeding slide. The number "1" will then return to the display 22 to indicate he is now to answer the first question in the new group. However, if one or more of the questions were incorrectly answered, the "WRONG" light will momentarily be illuminated on the display screen 22 and the slide will remain projected on the screen. The number "1" will then come on again, thereby indicating that the student must again answer the questions in the group. Although the student knows he has made at least one mistake he does not know where or how he made it. He must endeavor to find his error and correct it so that he can proceed to the next succeeding slide as it is virtually impossible for him to successfully guess at the answers.

TEST MODE

If it is desired to test the student's knowledge of a particular subject, the machine 12 may be operated in the TEST mode to thereby determine the accuracy with which he is capable of answering questions. To place the machine 12 in operation in the TEST mode, the mode selector switch 216 is manually placed in the "TEST" position so that the moveable contact 220A to 220E will engage the TEST fixed contacts in each of the banks 218A to 218E respectively. This will effectively interconnect the changer mechanism in the projector with the test contact in the bank 218B and disconnect the solenoid for controlling the direction of change whereby the changer will operate in the forward direction only. Also the relay coils 89 and 148 will be disconnected from the circuit so that they cannot be energized.

A tray or magazine of slides suitable for use in the TEST mode may be positioned in the changer rack so that the number "1" slide will be in the number "1" position. Such a tray or magazine will be substantially identical to that used in the DRILL mode, that is, each of the slides will be substantially identical to the slide in FIG. 3 and will consist of a group of five questions numbered 1 to 5 in combination with ten possible answers lettered A to J inclusive.

Once the magazine is in the number "1" position, the various relays, stepping switches, etc. may all be set to the number "1" position by depressing the homing button so as to thereby momentarily close the contacts in the ganged switches 254A, 254B, and 254C. Closing these switches will respectively momentarily energize the relay coil 148 and repeatedly energize and de-energize the coils 89 and 60 so as to step all of the stepping switches back to the number "1" positions in the manner described before. Since the moveable contact 220d will be positioned on a disconnected contact in the bank 218D, the relay 148 will not remain de-energized. As a consequence, the switch 146 will be positioned to illuminate the "TEST" light and the switch 142 will be closed to illuminate the number "1" question light on the display 22.

Following this, the slide will be in the projection position so that the student will see the questions and answers. The student then proceeds to answer each of the questions in the group in the sequence indicated by the illuminated question lights "1" to "5" inclusive on the display screen 22 by depressing the buttons A to J. Each time one of the various answer buttons is depressed, the relay coil 60 will be energized and the various moveable contacts 58A to 58E will advance across the banks 56A to 56E. Each time a correct answer is given, the line 108 will be grounded in the same manner described above. Since the moveable contact 220E is at the "TEST" contact, each correct answer will advance the counter. Thus the counter will now accumulate a count of the total number of correct answers. Each correct answer will also be effective to energize the relay 158 which in turn will cause the switch 156 to close momentarily. By closing the toggle switch 160, the "RIGHT" light 154 will go on each time a correct answer is given. As a result, each time the student answers a question he will know immediately whether or not he has correctly answered the question. As will be seen in the "TEST" mode, the student has only one chance at each question. Thus the indication of the accuracy of a preceding answer will not be of any material assistance in passing the test.

When the student has answered the last question in the group, the moveable contact 58D in the bank 56D will be effective to establish a ground connection for the switch 190. The relay coil 192 will then be intermittently energized, so as to thereby open and close the switch to ground the coil 60 and step all the moveable contacts 58A to 58E into the number "1" position. When the moveable contact 58E engages the fixed contact 207, a direct ground contact will extend through the bank 218B to the changer mechanism in the projector. Thus the slide projected will always be advanced irrespective of the student's performance in answering the questions. Thus as pointed out before, the student has only one chance to answer each of the questions.

If it is desired to permit a single tray of slides to be utilized for testing students of differing capabilities, the degree of difficulty of the questions may be graded so that the number one question on each slide is of substantially the same degree of hardness. Similarly all of the questions of the same number are of substantially the same degree of hardness with the hardness increasing with the number. Thus the number one question on each slide is the easiest, and the number 5 question is the most difficult. Thus, if the student's ability is very limited, the moveable contacts 172, 174, 176 and 178 may be moved into the number 1 position in switch 180. Thus, when the student has finished the first question, the moveable contact 58D will engage the contact 162 and thereby form a ground circuit through the moveable contact 172 in the bank switch 190 for the relay 192. This will result in the relay 192 being pulsed so as to return all of the moveable contacts 58A to 58E to the home or number one position and also change the slide to the next slide. By setting the moveable contacts 172 to 178 at any of the intermediate positions 2, 3, 4, or 5, it will be seen that the relay 192 will be energized after the student has answered the predetermined number of questions on each slide.

It may thus be seen that when the machine is set to operate in the TEST mode, initially the word "TEST" will be illuminated on the instruction display 22, and the number "1" question light will be on. In addition, the screen will have displayed thereon a group of questions and a group of multiple choice answers. The ADVANCE button will be disabled, however the ANSWER buttons will be enabled. Each time the student selects an answer by depressing one of the buttons A to J, the next succeeding question light 147 will be energized, thereby indicating that the student is to answer the next question in the group, or if the final question in the group as defined by the setting of switch 180 has been answered, the projected slide will automatically be changed to the next succeeding slide in the magazine, with a running total of the number of correct answers being recorded on the counter 222. It will be noted that the number of mistakes made by the student will not in any way interfere with the progression through the questions or the slides. Thus, once a question has been answered, the student will not be capable of giving a second answer or changing his original answer. Thus, the closing of the toggle switch 160 so as to give the student a signal as to selecting the correct answer, will not in any way interfere with testing his true ability to answer the questions.

REVIEW MODE

If it is desirable for a student to review a subject which he has previously studied, he may do so by operating the machine 12 in a review mode. To place the machine 12 in operation in a REVIEW mode, the mode selector switch 216 is manually placed in the "REVIEW" position so that the moveable contacts 200a to 220e will engage the REVIEW contacts in each of the banks 218A to 218E respectively. This will effectively interconnect the changer mechanism in the projector 24 with the review contact in the bank 218B and disconnect the solenoid for controlling the direction in which the changer may operate whereby the changer may only move in the forward direction.

The various relays, stepping switches, etc. may all be set to the number "1" position by depressing the homing button so as to thereby momentarily close the contacts in the ganged switches 254A, 254B, and 254C. Closing switch 254a will momentarily energize the relay coil 148 and close the switch 248. Since a current may now flow through the bank 218D, the relay 148 will again be self-energizing so as to energize the switches 48, 142, 146, 252. This will respectively disable the answer buttons, extinguish the "TEST" light and turn on the "STUDY" light and enable the "ADVANCE" button. Closing the switches 254B and 254C will cause the "On-Normal" and "Interrupter" switches 276, 278, 282 and 284 to be operative to pulse the coils 60 and 89 so as to advance all of the moveable contacts into the number "1" position as described before.

A tray or magazine of slides suitable for use in the "REVIEW" mode may be positioned in the changer rack so that the first slide will be in the first position for projection onto the screen 20. Such a tray may be similar to the trays or magazines used in the "TEACH" mode. That is, every other slide is a text slide similar to FIGURE 2 with the slides therebetween consisting of groups of questions and multiple choice answers.

Initially the student will see the first text slide and the "STUDY" light will be on indicating the text material is to be studied. When the student has completed his review of the material he may depress the "ADVANCE" button. This will energize the relay coil 256 and move the switch 226 so as to ground the changer mechanism through the bank 218B thereby advancing to a question and answer slide. This will simultaneously open the ground circuit for the coil 148 and cause it to be de-energized whereby the "STUDY" light will go out and the "TEST" and number "1" light 144 will go on. The switches 48 and 252 will also be actuated to enable the answer buttons A to J and disable the "ADVANCE" button.

The student may then proceed to answer the questions in sequence as indicated by the lights 147. Normally the toggle switch 160 will be closed, thus each time a correct answer is given so as to energize the relay coil 158, the "RIGHT" light 154 will go on to let the student know immediately he has correctly answered the question. When the final question in the group has been answered, the moveable contacts 58A to 58E will all be returned to their number one position substantially as described in the teaching mode except that the slides will always advance. More particularly, since the review contact in bank 218A is not connected to the control solenoid, the changer mechanism will always be in the forward condition and since the contact 207 is connected through bank 218A to the changer the slides will always change.

It may thus be seen that when the machine 12 is operating in the "REVIEW" mode, it will function essentially the same as in the "TEACH" mode. However, the student will be notified immediately of his errors and he will not be required to correct them as the machine 12 will advance through the tray of slides irrespective of any errors by the student.

It may thus be seen that a teaching machine has been provided which will not only increase the student's ability to study and comprehend text material but will also increase and maintain his comprehension, retention and proficiency, and test the extent of his knowledge of the subject. While a single embodiment of the present invention has been disclosed, it will be readily apparent to those skilled in the art that numerous changes and modifications may be made thereto without departing from the true spirit of the present invention. For example, although the material has been referred to as being on slides, it is readily apparent that any form of recording media such as strips of film, opaque paper, magnetic recordings, etc., may be used. If desired, timing means may be included for limiting the period of time that a slide of text material and/or a test slide of questions and answers is projected. Also, if desired, means may be provided for varying the portions of a slide that are being projected onto the screen. In addition, structure of the machine and the sequence in which it operates and the manner in which it responds may be modified extensively to correspond to any particular set of circumstances. Accordingly, the foregoing drawings and the description thereof are for illustrative purposes only and are not intended to in any way limit the invention, which is to be defined only by the claims which follow.

I claim:

1. A teaching machine for teaching a student a lesson that is divided into a sequence of increments of text material and groups of questions and possible answers thereto, said machine comprising the combination of
   display means for alternately displaying said increments of text material to said student and displaying one of the group of questions and possible answers thereto relating to a previously displayed increment of text material,
   answering means for said student to indicate a choice of an answer for each of the questions in a group, and
   control means operatively interconnected with said display means for changing the displays presented thereby, said control means being operatively interconnected with said answering means for actuation in response to answers chosen by the student, said control means including means for actuating said display means for redisplaying the previously displayed increment of text material if at least one of the questions in a group is incorrectly answered.

2. A teaching machine for teaching a student a lesson that is divided into a sequence of increments of text material and groups of questions and possible answers thereto, said machine comprising the combination of
   display means for alternately displaying said increments of text material to said student and displaying one of the groups of questions and possible answers thereto relating to a previously displayed increment of text material,
   answering means for said student to indicate a choice of an answer for each of the questions in a group, and
   control means operatively interconnected between the answering means and the display means for actuating the display means to display a new increment of text material in response to the answering means only if all of the chosen answers correspond to the correct answers for all of the questions in the group and wherein the control means includes means responsive to the answering means for actuating the display means to redisplay a previously displayed increment of text material if at least one of the questions in the group is incorrectly answered.

3. A teaching machine for teaching a student a lesson that is divided into a sequence of increments of text material and groups of questions and possible answers thereto, said machine comprising the combination of
   means for alternately displaying said increments of text material to said student and displaying groups of questions and a plurality of multiple choice answers to said questions,
   changer means operatively interconnected with said display means for changing the material displayed by said means,
   manually actuatable means operatively interconnected with said changer effective only for replacing a display of an increment of text material with a group of questions and answers relating thereto,
   answer means for said student to indicate a choice of an answer for each of the questions in a group,
   control means operatively interconnected with the display means and the answer means and responsive to the latter for actuating the changer only after all of the questions have been answered, said control means including means responsive to the answer means for producing a replacement of a group of questions and answers with a new increment of text material only if all of the chosen answers correspond to the correct answers for all of the questions in the group.

4. A teaching machine for teaching a student a lesson that is divided into a sequence of increments of text material, said machine comprising the combination of
   display means for displaying a series of separate recording media, said series including a first group of recording media each of which contains one of said increments of text material and a second group of recording media each of which contains a group of questions relating to an increment of text material contained on a preceding recording media and a plurality of multiple choice answers to said questions,
   changer means operatively interconnected with said display means for advancing from one of said recording media in said series to a succeeding recording media in said series or returning to a preceding recording media in said series,
   answer means for said student to indicate a choice of answers for the questions in a group, and
   means operatively interconnected with said answer means and responsive to said choice of answers and effective to provide a first signal if all of the answers in the group are correct and a second signal if at least one of the answers is incorrect, control means operatively interconnected with said changer and said last means and responsive to said signal to actuate said changer for causing said display means to display a recording media having a new increment of text material only when a first signal occurs and all of the chosen answers correspond to the correct answers for all of the questions in the group, the control means including means responsive to the second signal to actuate the changer for causing the display, means to redisplay the old increment of text in the series only when the second signal occurs and one of the chosen answers fails to correspond to the correct answer of one question in the group.

5. A teaching machine for teaching a student a lesson that is divided into a sequence of increments of text material, said machine comprising the combination of
   display means for displaying a series of separate recording media, said series including a first group of recording media each of which contains one of said increments of text material and a second group of recording media each of which contains a group of questions relating to an increment of text material contained on a preceding recording media and a plurality of multiple choice answers to said questions,
   a changer operatively interconnected with said display means for advancing from one of said recording media in said series to a succeeding recording media in said series or returning to a preceding recording media in said series,
   first manually actuatable means for said student to indicate a choice of one of said answers for each of the questions in a group, first enabling means effective to enable said first manual means only when a recording media in said second group is displayed,
   second manually actuatable means operatively interconnected with said changer for causing said changer to replace a media having an increment of text material with a media having a group of questions related to said increment, second enabling means effective to enable said second manual means only when a recording media in said first group is displayed, control means operatively interconnected with said changer and said answer means and responsive to the said first manually actuable means, said control means including means effective when all of the questions in a group are answered to automatically actuate said changer for replacing said question and answer media with a media having a new increment of text material only if all of the chosen answers correspond to the correct answers for all of the questions in the group and including means to automatically actuate said changer for replacing said question and answer media with a media containing a preceding increment of text material if at least one of the chosen answers in said group is incorrect, said control means being effective to conceal from the student which questions were incorrectly answered.

6. A machine for teaching a student a lesson that is divided into a sequence of small increments of text material, said machine comprising the combination of a projector having a changer mechanism for storing a series of slides, said changer mechanism when in forward being effective to advance and cause a succeeding slide in said series to be projected and when in reverse being effective to cause a preceding slide in said series to be projected, said series of slides consisting of, alternately, text slides containing said increments of text material and question and answer slides containing a group of questions relating to a preceding text slide and a plurality of multiple choice answers to said questions, first manually actuatable means for said student to choose the correct answers for each of the questions in a group, first enabling means for enabling said first manual means only during the interval that a question and answer slide is being projected, second manually actuatable means operatively interconnected with said changer to replace a text slide with a question and answer slide, second enabling means for enabling said second manual means only during the interval that a text slide is being projected, and control means operatively interconnected with said changer mechanism and said first manually actuable means and responsive to said first manually actuable means for automatically positioning said changer in reverse when at least one of the questions in a group is incorrectly answered and including means for positioning said changer in forward when all of the questions in a group are correctly answered, said last means including means to conceal from the student which questions were incorrectly answered.

7. A teaching machine for teaching a student a lesson that is divided into a sequence of increments of text material, said machine comprising the combination of means for alternately displaying said increments of text material and groups of questions relating to said text material and a plurality of multiple choice answers to said questions, a separate answer means for each of the possible answers for indicating an answer to each question, means for changing said display from a group of questions and answers to an increment of text material, code means for interconnecting said answer means with said changer, said changer being effective to replace said questions and answers with a preceding increment of text material if said answer means are actuated in other than the correct sequence, said code means including means for varying said correct sequence for each question and answer slide, and control means interconnected between the code means and the changer and responsive to actuation of the answer means for actuating the changer if the answer means are incorrectly actuated.

8. A teaching machine for teaching a student a lesson that is divided into a sequence of increments of text material, said machine comprising the combination of means for alternately displaying said increments of text material and displaying groups of questions relating to a preceding increment of text material and a plurality of multiple choice answers to said questions, a separate answer means for each of said multiple choice answers for indicating an answer to each question, changer means for advancing and changing said display from a group of questions and answers to a succeeding increment of text material, or reversing and changing said display from said group of questions and answers to a preceding increment of text material, control means operatively interconnected with said changer means for moving said change means in the forward or reverse directions, and a code means for interconnecting said answer means with said control means in a particular sequence related to the correct answers, said control means including means to actuate said changer in the reverse direction to replace said questions and answers with the preceding increment of text material if said answer means are actuated in other than said predetermined sequence, said code means including means to conceal said predetermined sequence from said student and said code means including means for changing said sequence with each group of questions and answers.

9. A teaching machine for teaching a student a lesson that is divided into a sequence of increments of text material, said machine comprising the combination of a projector for projecting slides onto a display area for viewing by a student, a changer for holding a series of slides at a time in said projector for positioning one of said slides in position for projection onto said display area, a series of said slides disposed in said changer, said series of slides including alternately slides containing said increments of text material and slides having questions relating to the preceding text increment and a plurality of multiple choice answers to said questions, drive means for running said changer in a forward direction for showing the succeeding slides in the series and for running said changer in a reverse direction for showing the preceding slides in said series, separate answer means for each of the possible answers on a question and answer slide, manually operable means interconnected with said changer, said manual means including first means operative only when a text slide is in a viewing position and said first means advancing said changer when actuated for changing the slide in projection position from a text slide to the succeeding question and answer slide, and code means for interconnecting said answer means with said drive means, in a predetermined pattern, said interconnection including switch means, said answer means including means to energize said changer in the reverse direction when all of the questions in a group are answered to place a preceding text slide in said projection position if said switch means are not actuated in a predetermined sequence and to energize said changer in the forward direction to place a succeeding text slide in said projection position if said switches are actuated in said predetermined sequence, means to actuate said switch means to change said sequence each time said questions and answers slides change, and means for varying the pattern of said code means with said lessons to thereby change said correct sequence for each lesson.

10. The method of teaching a student, comprising the steps of displaying an increment of text material relating to the subject being taught for studying by the student, removing said text material from the view of the student, displaying a group of questions related to said text material and a group of multiple choice answers to said questions, receiving an answer to each question from the student and determining the accuracy of the answers given without telling the student which answers are incorrect, and redisplaying the preceding increment of text material if all of said questions in the group are not accurately answered and displaying a succeeding increment of text material only if all of said questions are accurately answered.

11. The method of teaching a student comprising the steps of
displaying an increment of text material relating to the subject being taught for studying by the student, removing the text material from the view of the student, displaying a group of questions related to said text material and a group of multiple choice answers to said questions, obtaining an answer to each question in the group from the student, determining the accuracy of the answers given and concealing from said student which answers are incorrect and which are correct, and redisplaying the preceding increment of text material if all of said questions in the group are not accurately answered while informing the student only that he has made at least one mistake in answering the group, and displaying a succeeding increment of text material only if all of said questions are accurately answered.

12. The method of teaching a student a lesson on a subject comprising the steps of
dividing said lesson into a plurality of increments of text material that progressively explain said lesson, displaying only one of said increments of text material relating to a portion of said lesson for studying by said student, and displaying a group of questions related to said increment of text material and a group of multiple choice answers to said question so that said student can choose a correct answer to each of said questions, receiving a chosen answer to each question in the group from the student, determining the accuracy of each of said choices, if all of the answers are correct to so advise the student and advance to a succeeding increment of text material, if at least one answer in the group has not been correctly answered while concealing the mistakes made and redisplay the preceding increment of text material.

13. The method of teaching a student a lesson on a subject comprising the steps of
dividing said lesson into a plurality of increments of text material that progressively explain said lesson, displaying only an increment of text material relating to a portion of said lesson for studying by said student, concealing said increment of text material, displaying a group of questions related to said increment of text material and a group of multiple choice answers to said questions so that said student can choose a correct answer to each of said questions, receiving a choice of answers to each question from the student, determining the accuracy of the answers chosen, concealing any mistakes made by the student, and displaying a succeeding increment of text material only if all of the questions in a group are correctly answered and redisplaying the preceding increment of text material if at least one of said questions in said group is incorrectly answered.

14. The method of teaching a student a lesson on a subject comprising the steps of
dividing said lesson into a plurality of increments of text material that progressively explain said lesson, displaying only one of said increments of text material relating to a portion of said lesson for studying by said student, displaying a group of questions related to the preceding text material and a group of multiple choice answers to said question so that said student can choose a correct answer to each of said questions, determining the accuracy of each answer given by the student and concealing which answers are correct and which are incorrect, and displaying a succeeding increment of text material only if all of the questions in a group are correctly answered and redisplaying the preceding increment of text material if at least one of the questions in the group is incorrectly answered.

15. A recording media for use in a teaching machine wherein the machine includes means for displaying only one portion of said media at a time and means for changing the portion of said media displayed to a succeeding portion when the machine is manually actuated in accordance with a predetermined coding and to a preceding portion when the machine is not manually actuated in accordance with the predetermined coding, said media including alternately individual portions of text material and individual portions each having a group of questions relating to the text material on the preceding portion and a plurality of possible answers to said questions, the positions of the correct answers on each portion varying to correspond to the predetermined coding in said machine.

16. A recording media for use in a teaching machine wherein the machine includes means for displaying only a portion of said media and a multiple choice answering means including means for changing the portion of said media to a succeeding portion when said answering means are actuated in a proper sequence and to a preceding portion when said answering means are not actuated in said proper sequence, said media including, alternately, individual portions having increments of text material and individual portions each having a group of questions relating to the text material on a preceding portion and a plurality of multiple choice answers to said questions, the correct answers for the questions in each group being designated to correspond to the proper sequence for said answering means.

17. A series of slides for use in a teaching machine wherein the machine includes means for displaying one of said slides and answering means including means to actuate said displaying means for displaying a succeeding slide when said answering means are actuated in a correct sequence and for displaying a preceding slide when said answering means are not actuated in said correct sequence, said series of slides including, alternately, first individual slides having increments of text material thereon, and second individual slides each having groups of questions related to the text material on a preceding slide and a plurality of multiple choice answers, the correct answers on said question and answer slides corresponding to the correct sequence for actuating said answering means.

18. A series of slides for use in a teaching machine wherein the machine includes question means for indicating a question to be answered and answer means for recording a multiple choice answer to the question and means for changing said slides a first direction when said multiple choice answers are chosen in a predetermined sequence and for changing said slides in a second direction when said multiple choice answers are not chosen in said predetermined sequence, said series including, alternately, first individual slides and second individual slides, said first individual slides including increments of text material and said second individual slides each including a group of questions and a group of answers, each of said questions corresponding to said answer means, at least a portion of the answers including a correct answer for each of said questions, each of said correct answers corresponding to said predetermined sequence.

19. A teaching machine for teaching a student a lesson that is divided into a sequence of increments of text material in a series of groups of questions and possible answers to said questions, said machine including:
  display means for presenting a visual display to said student,
  changer means operatively interconnected with said display means for alternatively supplying one of said increments of text material to said display means or one of said groups of questions and possible answers thereto,
  first manually operable means,
  enabling means interconnecting said manually operable means with said changer means only during the intervals that increments of text material are being displayed, said first manually operable means including means to only advance said changer from one of said increments of said text material to a group of questions and answers relating to a previously displayed increment of text material,
  second manually operable means having a separate portion for each of the possible answers, and
  storage means interconnected with said second manually operable means to accumulate a score or record of right and wrong answers to the questions within a group, said storage means including means operatively interconnected with said changer and to advance said changer to a succeeding increment of text material only if all of the questions are correctly answered and to actuate said changer to return to a preceding increment of text material if at least one of the questions in the group is improperly answered.

References Cited by the Examiner
UNITED STATES PATENTS

| | | | |
|---|---|---|---|
| Re. 23,030 | 8/1948 | Holt | 35—9 |
| 2,862,828 | 3/1958 | Hamilton | 35—9 |
| 2,947,092 | 8/1960 | Arnold | 35—9 |
| 2,953,859 | 9/1960 | Fink | 35—9 |
| 2,965,975 | 12/1960 | Briggs | 35—9 |
| 3,052,041 | 10/1962 | Luxton | 35—9 |
| 3,077,038 | 2/1963 | Williams et al. | 35—9 |
| 3,103,073 | 9/1963 | Nickl et al. | 35—9 |
| 3,123,920 | 3/1964 | Crowder et al. | 35—9 |
| 3,126,646 | 3/1964 | Penraat et al. | 35—9 |

FOREIGN PATENTS 878,933  10/1961  Great Britain.

OTHER REFERENCES

"Teaching Machines and Programmed Learning," edited by Lumsdaine and Glaser, pages 286–298 relied on.

EUGENE R. CAPOZIO, *Primary Examiner.*

ABRAHAM BERLIN, JEROME SCHNALL, *Examiners.*

SHELDON M. BENDER, *Assistant Examiner.*